United States Patent
Paek et al.

(10) Patent No.: US 9,542,557 B2
(45) Date of Patent: Jan. 10, 2017

(54) SNOOP-BASED KERNEL INTEGRITY MONITORING APPARATUS AND METHOD THEREOF

(71) Applicant: SNU R&DB Foundation, Seoul (KR)

(72) Inventors: Yun Heung Paek, Seoul (KR); Brent Byunghoon Kang, Fairfax, VA (US); Hyungon Moon, Seoul (KR); Hojoon Lee, Daejeon (KR); Jihoon Lee, Hwaseong (KR); Kihwan Kim, Seoul (KR)

(73) Assignee: SNU R&DB FOUNDATION, Seoul (KR)

(*) Notice: Subject to any disclaimer, the term of this patent is extended or adjusted under 35 U.S.C. 154(b) by 317 days.

(21) Appl. No.: 14/262,685

(22) Filed: Apr. 25, 2014

(65) Prior Publication Data

US 2014/0359183 A1 Dec. 4, 2014

(30) Foreign Application Priority Data

Jun. 4, 2013 (KR) .......................... 10-2013-0064332

(51) Int. Cl.
*G06F 21/55* (2013.01)
*G06F 21/56* (2013.01)
(Continued)

(52) U.S. Cl.
CPC ......... *G06F 21/567* (2013.01); *G06F 12/1425* (2013.01); *G06F 13/24* (2013.01);
(Continued)

(58) Field of Classification Search
CPC ........ G06F 21/567; G06F 21/52; G06F 21/55; G06F 21/554; G06F 21/56; G06F 13/24; G06F 2221/2153; G06F 12/1425
See application file for complete search history.

(56) References Cited

U.S. PATENT DOCUMENTS

| | | | |
|---|---|---|---|
| 8,365,297 B1 | 1/2013 | Parshin et al. | |
| 2014/0115256 A1* | 4/2014 | Liu | G06F 12/0866 711/122 |

FOREIGN PATENT DOCUMENTS

| | | |
|---|---|---|
| KR | 10-0853721 B1 | 8/2008 |
| KR | 10-1064164 B1 | 9/2011 |
| KR | 10-1240311 B1 | 2/2013 |

OTHER PUBLICATIONS

Petroni, Jr., Nick L.; Fraser, Timothy; Molina, Jesus; and Arbaugh, William A.; "Copilot—a Coprocessor-based Kernel Runtime Integrity Monitor"; Proceedings of the 13th USENIX Security Symposium; The USENIX Association; Aug. 9-13, 2004.*

(Continued)

*Primary Examiner* — Glenn A Auve
(74) *Attorney, Agent, or Firm* — Nixon Peabody LLP; Khaled Shami (57) ABSTRACT

A snoop-based kernel integrity monitoring apparatus and a method thereof are provided. More particularly, provided are a kernel integrity monitoring apparatus which is provided as a hardware device independent of a host system, and snoops traffic occurring in a system bus of the host system and by detecting a write attempt in a kernel immutable region, monitors integrity of the kernel, and a method thereof. According to the apparatus and method, by analyzing traffic of the system bus of the host system, a write attempt in the kernel immutable region is detected. Thus, a transient attack which is difficult for a snapshot method to detect can be detected.

22 Claims, 8 Drawing Sheets

(51) Int. Cl.
*G06F 13/24* (2006.01)
*G06F 12/14* (2006.01)
*G06F 21/52* (2013.01)

(52) U.S. Cl.
CPC .............. *G06F 21/52* (2013.01); *G06F 21/55* (2013.01); *G06F 21/554* (2013.01); *G06F 2221/2153* (2013.01)

(56) References Cited

OTHER PUBLICATIONS

Moon et al. thesis entitled "Vigilare: Toward Snoop-based Kernel Integrity Monitor", 8th Research on Software Analysis for Error-free Computing Center Workshop, Jul. 26, 2012.
Lee et al., thesis entitled "KI-Mon: A Hardware-assisted Event-triggered Monitoring Platform for Mutable Kernel Object", 22nd USENIX Security Symposium, Oct. 16, 2012.
Notice of Allowance in Korean Patent Application No. 10-2013-0064332 dated Jan. 22, 2014.

\* cited by examiner

SNOOP-BASED KERNEL INTEGRITY MONITORING APPARATUS AND METHOD THEREOF

RELATED APPLICATIONS

This application claims the benefit of Korean Patent Application No. 10-2013-0064332, filed on Jun. 4, 2013, in the Korean Intellectual Property Office, the disclosure of which is incorporated herein in its entirety by reference.

BACKGROUND

1. Field

One or more embodiments of the present invention relate to a snoop-based kernel integrity monitoring apparatus and a method thereof, and more particularly, to a kernel integrity monitoring apparatus which is provided as a hardware device independent of a host system, and snoops traffic occurring in a system bus of the host system and by detecting a write attempt in a kernel immutable region, monitors integrity of the kernel, and a method thereof.

2. Description of the Related Art

In order to protect the integrity of an operating system kernel, many security specialists strive to make a security monitor independent of a host system.

Recent efforts for this kernel integrity monitoring are broken down into two approaches. One if a hardware-based approach and the other is a hypervisor-based approach.

Recently, the hypervisor-based approach has gained popularity. However, as a hypervisor becomes more complex, the hypervisor may be exposed to much more software vulnerabilities.

Meanwhile, in order to protect the integrity of a hypervisor, an additional software layer may be inserted, but this is not sufficient to solve the problem. The additional software layer may introduce new vulnerabilities in a similar manner to that of the hypervisor. If another padding is inserted into the software layer for security, security may be strengthened temporarily but a fundamental solution is not provided.

In order to monitor the integrity of a hypervisor, hardware-supported schemes are introduced.

Most of existing solutions for kernel integrity monitoring make use of snapshot analysis schemes.

The snapshot analysis schemes are usually assisted by a predetermined type of hardware component which stores contents of a memory as a snapshot, and then, perform an analysis to find the traces of a rootkit attack.

HyperSentry, Copilot, and HyperCheck are exemplary approaches on snapshot-based kernel integrity monitoring.

Generally, snapshot-based monitoring schemes have inherent weakness because they inspect only those snapshots which are collected in predetermined intervals, and thus missing evanescent changes in between the intervals.

A transient attack means an attack which does not leave persistent traces in memory content. Transient attacks are capable of achieving their goals by using only momentary and transitory manipulations.

Attackers can exploit the critical limitations of snapshot-based kernel integrity monitoring. If attackers know the presence of a snapshot-based integrity monitoring and estimate the time of snapshot-taking and its intervals, they can devise a stealthy malware that subverts the kernel only in between the snapshots and restores all modifications in the next snapshot interval. This is called as a scrubbing attack.

Meanwhile, even though attackers do not know an exact snapshot-taking time, they can still create a transient attack that leaves its traces as minimal as possible. If the traces are left in the memory for a short time, there is a chance that it can avoid being captured in snapshot and thus it is not detected.

HyperSentry is not designed to address such transient attacks.

In relation to detecting such attacks using snapshot-based approaches, raising the rate of snapshot-taking may increase the probability of detection. However, frequent snapshot-taking inevitably causes increased overhead to the host system.

Randomizing the snapshot interval of the monitor can be another solution to defeat such deliberately designed transient attacks. However, the detection rate depends on luck and is not consistent. If the transient attack is short-lived, and not repeating its transient attacks, the probability of detection based on the random snapshot interval is low.

SUMMARY

One or more embodiments of the present invention include a snoop-based kernel integrity monitoring apparatus which by analyzing traffic of the system bus of the host system, and detecting a write attempt in the kernel immutable region, detects a transient attack which is difficult for a snapshot method to detect, and a method thereof.

Additional aspects will be set forth in part in the description which follows and, in part, will be apparent from the description, or may be learned by practice of the presented embodiments.

According to one or more embodiments of the present invention, a snoop-based kernel integrity monitoring apparatus includes: a snooper which stores the address of a kernel immutable region, and snoops traffic occurring in a system bus of a host system, and detects a write attempt to write in the kernel immutable region; and a verification unit which if a write attempt in the kernel immutable region is detected, generates a warning message including information on the detected write attempt in the kernel immutable region, wherein the kernel immutable region includes at least one of a kernel code region, a system call table, and an interrupt descriptor table.

The apparatus may operate independently of the host system.

The snooper may include: an immutable region address unit which stores the address of the kernel immutable region; and a comparison unit which compares the snooped traffic with the address of the kernel immutable region and thus detects a write attempt in the kernel immutable region.

The verification unit may include: an immutable region determination unit which determines the address of the kernel immutable region by obtaining information from the host system through a bridge immediately after the host system is booted; and a snooper setting unit which records the determined address of the kernel immutable region in the immutable region address unit.

The verification unit may further include a logging unit which records the history of write attempts in the kernel immutable region.

The snooper may further include a first in first out (FIFO) queue which provides the snooped traffic sequentially to the comparison unit.

The verification unit may further include a restoration unit which if a write attempt in the kernel immutable region is detected, delivers to the host system a restoration command to cancel jobs performed by the detected write attempt in the kernel immutable region.

The snooper may be provided between a system bus of the host system and a memory, and if the snooped traffic is not a write attempt in the kernel immutable region, may deliver the snooped traffic to the memory, and if the snooped traffic is a write attempt in the kernel immutable region, may not deliver the snooped traffic to the memory.

According to one or more embodiments of the present invention, a snoop-based kernel integrity monitoring method includes: determining the address of a kernel immutable region by obtaining information from a host system through a bridge immediately after the host system is booted; recording the determined address of the kernel immutable region in a snooper which is connected to the system bus of the host system; snooping traffic occurring in the system bus of the host system through the snooper; detecting a write attempt in the kernel immutable region in the snooped traffic; and if a write attempt in the kernel immutable region is detected, generating a warning message including information on the detected write attempt in the kernel immutable region.

According to one or more embodiments of the present invention, there is provided a computer readable recording medium having embodied thereon a computer program for executing the method.

According to the embodiments of the present invention, by analyzing traffic of the system bus of the host system, a write attempt in the kernel immutable region is detected. Thus, a transient attack which is difficult for a snapshot method to detect can be detected.

Also according to the embodiments of the present invention, the apparatus and method are independent of the host system, and thus are not influenced by the integrity of the system. Compared to the snapshot method, performance is less lowered and the detection rate of transient attacks is higher.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The invention may be embodied in many different forms with a variety of modifications, and a few embodiments will be illustrated in drawings and explained in detail. However, this should not be construed as being limited to the embodiments set forth herein, and rather, it should be understood that changes may be made in these exemplary embodiments without departing from the principles and spirit of the invention, the scope of which is defined in the claims and their equivalents.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention will now be described more fully with reference to the accompanying drawings, in which exemplary embodiments of the invention are shown. Like reference numerals in the drawings denote like elements.

As used herein, the term "and/or" includes any and all combinations of one or more of the associated listed items. Expressions such as "at least one of," when preceding a list of elements, modify the entire list of elements and do not modify the individual elements of the list.

Figure 1:
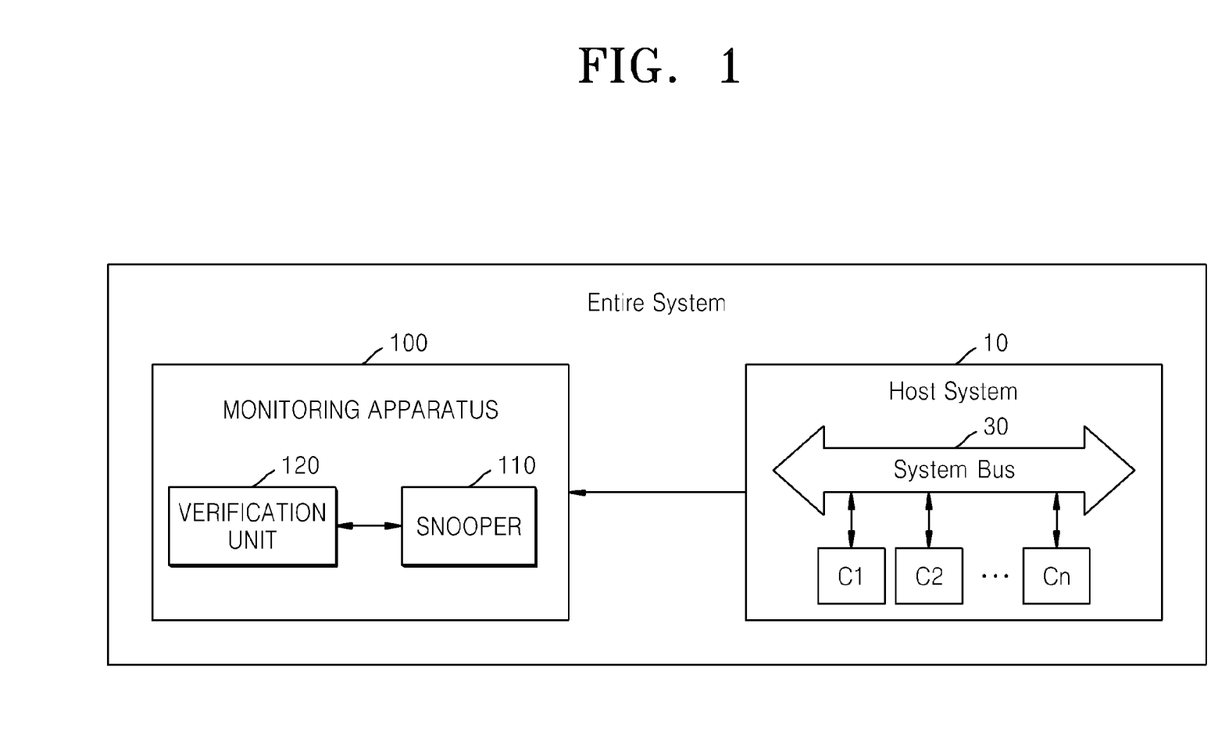
FIG. 1 is a diagram illustrating a kernel integrity monitoring apparatus according to an exemplary embodiment of the present invention.

FIG. 1 is a diagram illustrating a kernel integrity monitoring apparatus 100 according to an exemplary embodiment of the present invention.

The kernel integrity monitoring apparatus 100 includes a snooper 110 and a verification unit 120 that have connections to a system bus 30 of a host system 10. This kernel integrity monitoring apparatus 100 is designed to collect data streams in the system bus 30 of the host system 10 or data streams between the system bus 30 and a memory in order to overcome the limit of conventional memory snapshot examinations.

The kernel integrity monitoring apparatus 100 is an independent system existing separately outside the host system 10, and operates independently of the host system 10. The kernel integrity monitoring apparatus 100 monitors all jobs of the host system 10 by snooping traffic occurring in the system bus 30 of the host system 10.

C1 through CN in the host system denote a main processor, a memory controller which controls the memory, a network interface, etc. All processor instructions among input and/or output devices, the memory, and the processor are transferred through the system bus 10, and a snoop-based architecture monitors all system activities.

The kernel integrity monitoring apparatus 100 monitors this major route by using the snooper 110, and thus finds the location of a malicious system transaction.

The snooper 110 is a component which in real time snoops traffic occurring in the system bus 30 of the host system 10, and helps detect malicious traffic in the snooped traffic.

The malicious traffic means traffic which is capable of violating the integrity of an operating system (OS) by modifying a region affecting the integrity of the OS. The region affecting the integrity of the OS is a region in which any modification can cause change in the execution flow of the OS or predetermined data to be hidden from a user.

The kernel region includes a kernel immutable region and a kernel mutable region, and the kernel immutable region is a typical region affecting the integrity of the OS. Meanwhile, even among kernel mutable regions, there are regions in which any modification affects the integrity of the OS, which will be explained later. Those regions will now be referred to as preselected regions. These preselected regions are selected beforehand so as to be objects of monitoring by the snooper 110.

In conclusion, traffic having a write attempt in the kernel immutable region and traffic having a write attempt in the preselected region capable of violating the integrity of the OS in the kernel mutable region correspond to malicious traffic.

The kernel integrity monitoring apparatus 100 is focused on monitoring kernel immutable region and/or preselected region that are the regions capable of violating the integrity of the OS.

Hereinafter, a region including the kernel immutable region and the preselected region will be referred to as a monitoring region.

The kernel immutable region is a region which is important in the integrity of the OS, and in which any change is regarded as malicious. This kernel immutable region includes at least one of a kernel code region, a system call table, and an interrupt descriptor table (IDT).

As the kernel immutable region is an important element of the OS and any damage in the kernel immutable region causes all application running above the OS to be seriously affected, protection of the integrity of the kernel immutable region should be the top priority.

The kernel code region is the most outstanding example of the kernel immutable region, and the basic function of the kernel should never be modified after a bootstrap, and should not be modified during run time either.

Meanwhile, the system call table is another example of the kernel immutable region. Hijacking a system call of the kernel provides an efficient method for an attacker to control the kernel. Modifying the system call table of the kernel is a popular method for blocking the execution flow of a victimized system.

Each entry of the system call table indicates a corresponding call such as sys_read, and sys_write, and an attacker can easily hijacks a system call by inserting a function between a system call table and an actual system call handler.

Not only most of user mode applications but also kernel mode applications rely on basic system calls for communication with a file system, networking, process information, and other functions. Accordingly, controlling the system call table enables controlling the entire kernel at the bottom part.

The IDT is also an important kernel immutable region and an important gateway through which a system call passes. By destructing this low-level system call invocation procedure, an attacker can hijack a system call before the system call arrives at the system call table.

The snooper 110 stores the addresses of the kernel immutable region, and real time snoops traffic occurring in the system bus 30. If a write attempt in the kernel immutable region is detected in the snooped traffic, the snooper 110 provides the detected write attempt in the kernel immutable region to the verification unit 120.

Meanwhile, the kernel mutable region is the region obtained by excluding the kernel immutable region from the region which is used to operate the kernel.

Even in this kernel mutable region, there is a region in which any modification violates the integrity of the OS, and this region is referred to as a preselected region. That is, the preselected region is a region in which any modification can cause a change in execution flow of the OS or predetermined data to be hidden from a user. The preselected region includes at least one of a dispatch table and a data structure. This preselected region is preselected in the kernel mutable region so as to be an object of monitoring by the snooper 110.

Here, the dispatch table includes at least one of a static dispatch table and a dynamic dispatch table. The data structure may include at least one of a process list, a file list, and an inode.

As the snooper 110 does not know which region in the kernel mutable region affects the integrity of the OS, the snooper 110 detects a write attempt in the preselected region in the kernel mutable region among the snooped traffic, and provides the detected traffic to the verification unit 120.

Figure 8:
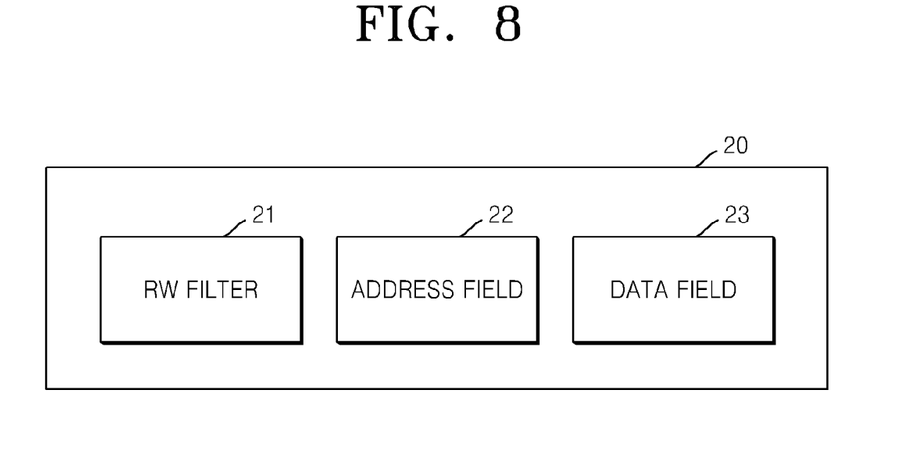
FIG. 8 is a diagram illustrating an example of traffic occurring in a system bus.

FIG. 8 is a diagram illustrating an example of traffic occurring in a system bus.

Each traffic 20 includes a read/write field 21 (hereinafter referred to as "RW field") including a flag indicating a read or write attempt, an address field 22 including a target address of the traffic, and a data field 23 having the content of the traffic.

If a write attempt in the kernel immutable region is detected in the snooped traffic, the snooper 110 provides only the contents including the RW field 21 and the address field 22 to the verification unit 120, which will be explained later.

If a write attempt in the preselected region in the kernel mutable region is detected, the snooper 110 provides all the contents including the RW field 21, the address field 22, and the data field 23 to the verification unit 120.

If a write attempt in the kernel immutable region or in the preselected region is detected, the verification unit 120 performs a role of generating a warning message including information on the detected write attempt. The generated warning message may be output through a display connected to the kernel integrity monitoring apparatus 100, or is transmitted to the host system 10 and output through a display connected to the host system 10, and thus informs the user of detection of malicious traffic.

Also, the verification unit 120 can determine the address of the kernel immutable region and the address of the preselected region, generate a white list corresponding to the determined preselected region, and set the snooper 110.

A threat which the kernel integrity monitoring apparatus 100 is to detect is kernel-level rootkits. The kernel-level rootkit is a transient attack which is difficult for the snapshot method to detect.

The transient attack is an attack which does not leave a persistent trace in the contents of the memory. In this scenario, the evidence of a malicious system change can be observed only in a short period of time, and it becomes difficult to detect malicious modifications in the memory.

The transient attack can be defined rather broadly. All the attacks that don't leave a persistent change may be classified as transient attacks.

A rootkit technique which delivers a malicious code by utilizing a Linux timer data structure and executes the malicious code in a reservation time shows a face of the transient attack. As the code included in the timer is discarded immediately after the execution, the trace stays in very short period of time in the memory and in addition, it is very difficult to find the trace.

If a transient attack which repeats modifications and recoveries in a fixed time interval by using a Linux timer is implemented, the snapshot analysis method is prone to miss an event of transient attack which is performed between snapshots.

Figure 2:
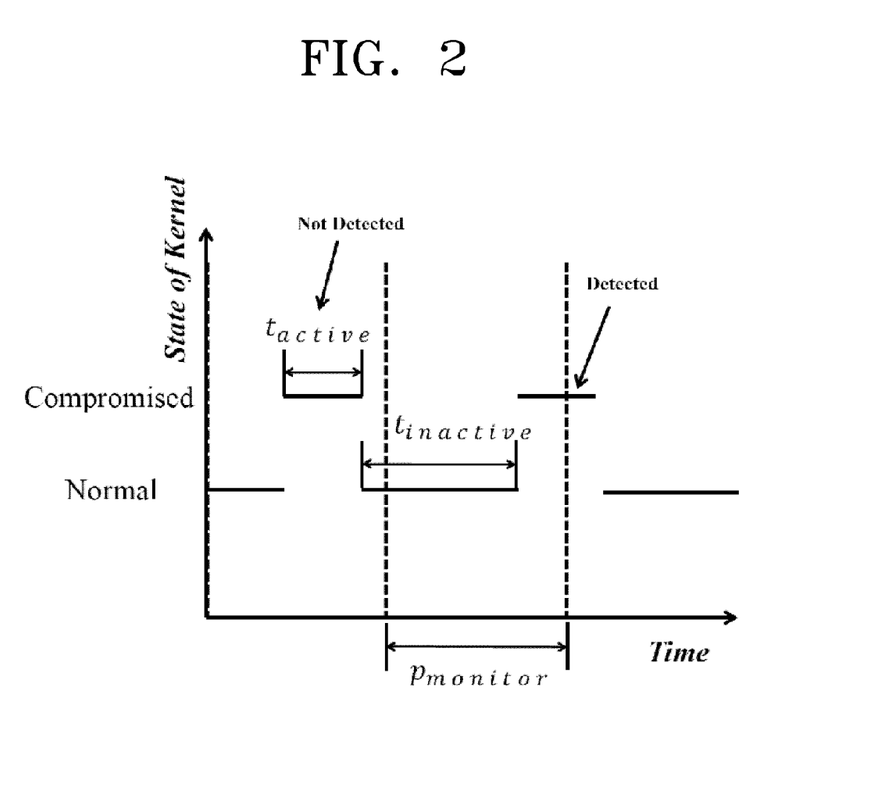
FIG. 2 is a diagram exemplifying the relation between a snapshot cycle of snapshot monitoring and transient attacks.

FIG. 2 is a diagram exemplifying the relation between a snapshot cycle of snapshot monitoring and transient attacks.

Imagine that a snapshot-based monitor detects a transient attack model shown in FIG. 2.

If the author of the kernel rootkit can properly adjust the duration of the attack t_active and the time of dormancy t_inactive, the author could completely evade the snapshot-based monitors. By staying dormant at the time of memory snapshot and becoming active in between the snapshots, the rootkit can fool the snapshot-based monitor.

A temporary solution to the limit of the snapshot-based method is to increase the rate of memory snapshot-taking or to randomize the snapshot intervals. However, frequent memory snapshots will inevitably impose a high performance overhead on the host system. Also, random snapshot timing may not properly represent the system states and will generate snapshots with little differences or snapshots with long time intervals.

In conclusion, the snapshot-based monitor is not appropriate to detect transient attacks.

In order to overcome the limit of the conventional memory snapshot examination, the kernel integrity monitoring apparatus 100 according to an exemplary embodiment of the present invention is designed to snoop traffic occurring in the system bus 30 of the host system 10, and to detect a write attempt in the kernel immutable region or a write attempt in the preselected region among the snooped traffic.

Figure 3:
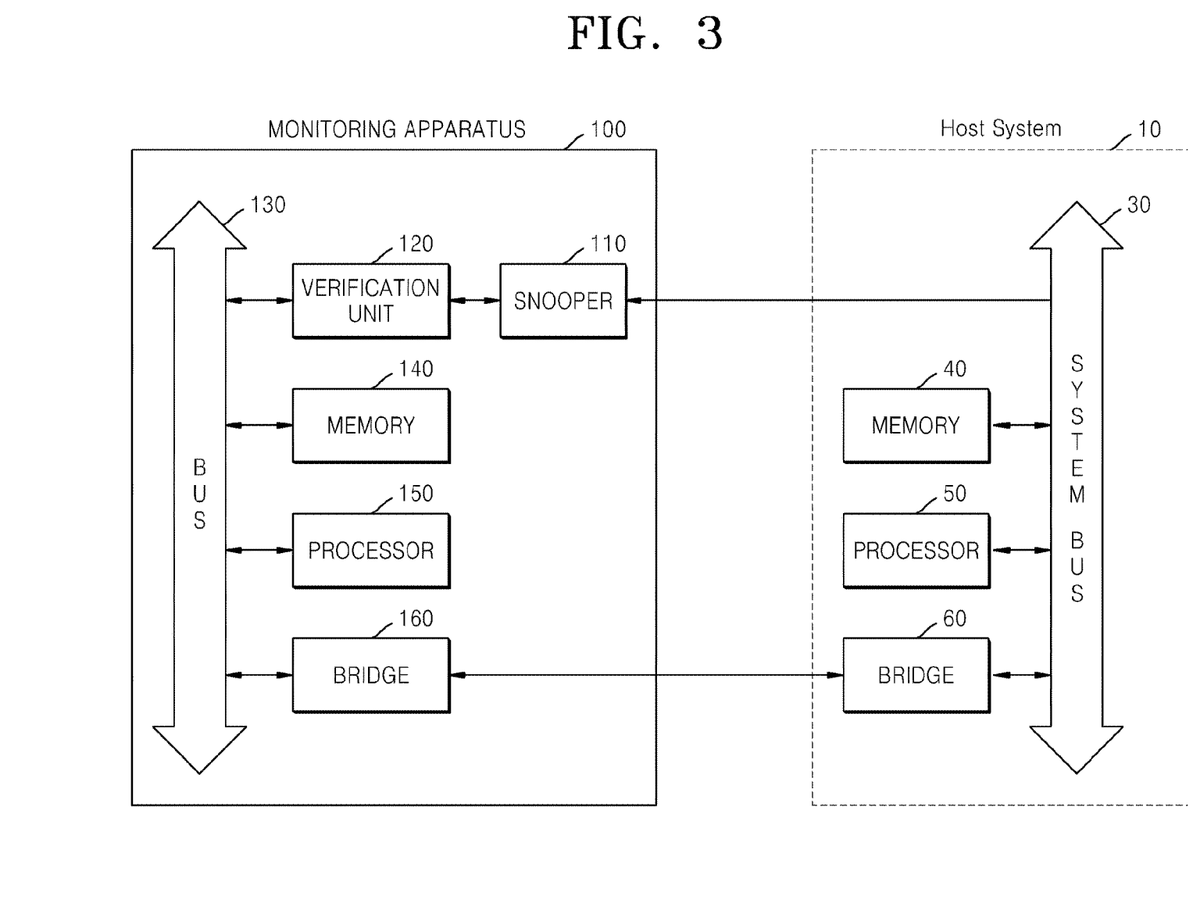
FIG. 3 is a block diagram illustrating a kernel integrity monitoring apparatus according to a first exemplary embodiment of the present invention.

FIG. 3 is a block diagram illustrating a kernel integrity monitoring apparatus according to a first exemplary embodiment of the present invention.

Referring to FIG. 3, the kernel integrity monitoring apparatus 100 according to the first embodiment includes a snooper 110 and a verification unit 120.

The snooper 110 stores the address of the kernel immutable region and is connected to the system bus 30 of the host system 10. The snooper 110 snoops traffic occurring in the system bus 30 of the host system 10 and detects a write attempt in the kernel immutable region among the snooped traffic. Here, the kernel immutable region includes at least one of a kernel code region, a system call table, and an interrupt descriptor table.

Also, the snooper 110 may store information on the address of the preselected region which is an object of monitoring in the kernel mutable region, and may further include a white list including information on the address of each preselected region and data items allowed in the address of each preselected region.

Accordingly, the snooper 110 can detect a write attempt in the preselected region among the traffic snooped in the system bus 30. Also, if a write attempt in the preselected region is detected, the snooper 110 compares the data field of the detected write attempt in the preselected region with the white list, and thus may determine whether or not the traffic in the preselected region is malicious traffic.

If a write attempt in the kernel immutable region is detected, the verification unit 120 reports the write attempt in the kernel immutable region to the host system 10.

Also, if a write attempt in the preselected region is detected, the verification unit 120 may report the write attempt in the preselected region to the host system 10. Meanwhile, the verification unit 120 may be set to report to the host system 10 only the traffic which is determined to be malicious traffic in the preselected region by the snooper 110.

The host system 10 is a system which is an object of monitoring by the kernel integrity monitoring apparatus 100, and includes a memory 40, a processor 50, and a bridge 60 which is connected to the kernel integrity monitoring apparatus 100.

As described above, the kernel integrity monitoring apparatus 100 is an independent system separate from the host system 10, and in order to operate independently of the host system 10, includes in itself a bus 130, a memory 140, a processor 150, and a bridge 160 connected to the host system 10.

As the kernel integrity monitoring apparatus 100 does not rely on the kernel of the host system 10, the integrity of the host system does not affect the integrity of the kernel integrity monitoring apparatus 100.

In order to increase the capability of the kernel integrity monitoring apparatus 100, the memory interface and interrupt handling of the kernel integrity monitoring apparatus 100 are designed by considering the independence.

The memory 140 of the kernel integrity monitoring apparatus 100 includes all programs and data which are used in the apparatus 100.

Meanwhile, the host system 10 should be designed such that by any means the host system 10 cannot access the memory 140 of the kernel integrity monitoring apparatus 100. By using the separate memory 140 and a memory controller that cannot be accessed from the host system 10, the memory 140 of the kernel integrity monitoring apparatus 100 is physically in a modification-free state.

Meanwhile, as interrupt handling may be an element preventing independence from the host system 10, peripherals controlled by the host system 10 should not transmit an interrupt to the kernel integrity monitoring apparatus 100 or should transmit an interrupt to the kernel integrity monitoring apparatus 100 in a restricted fashion.

Figure 4:
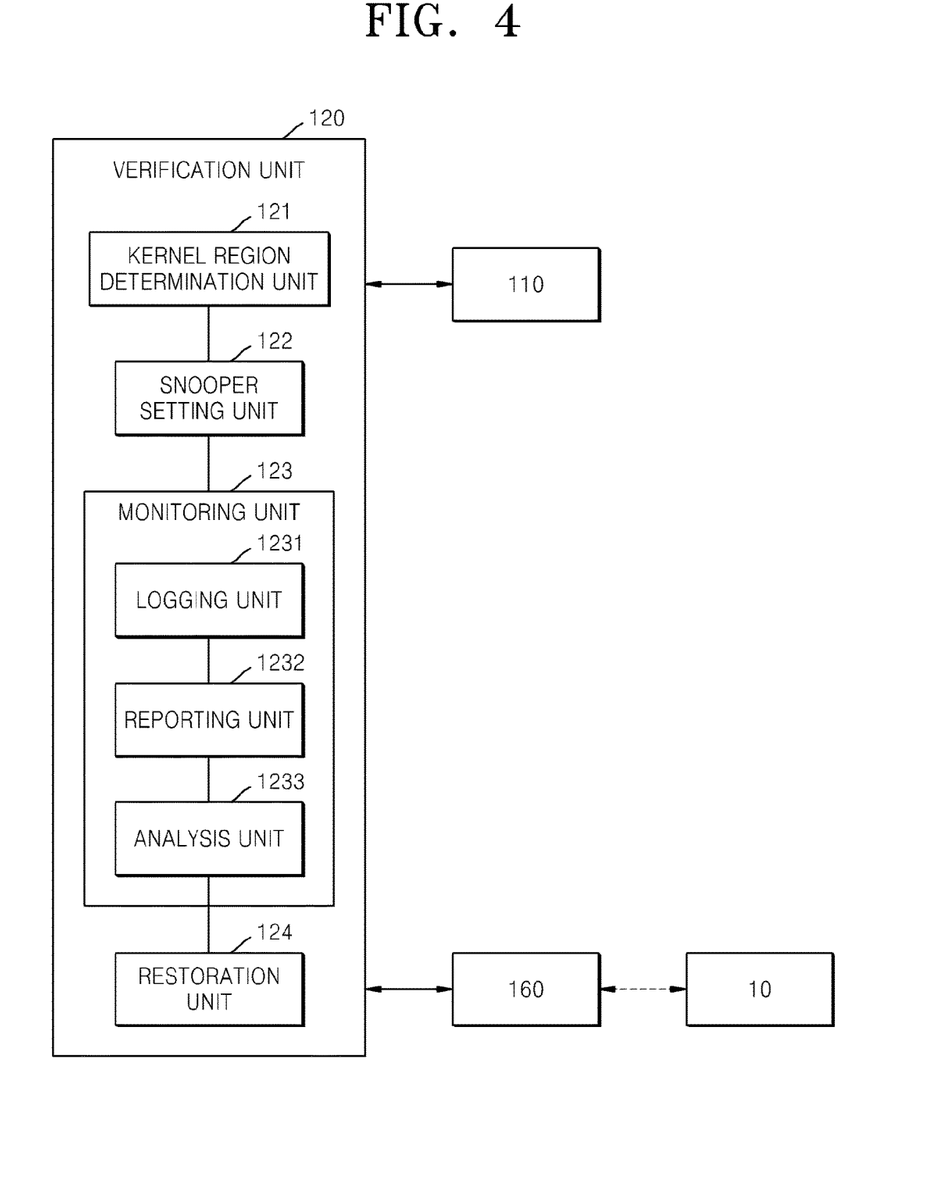
FIG. 4 is a block diagram illustrating a verification unit.
Figure 5:
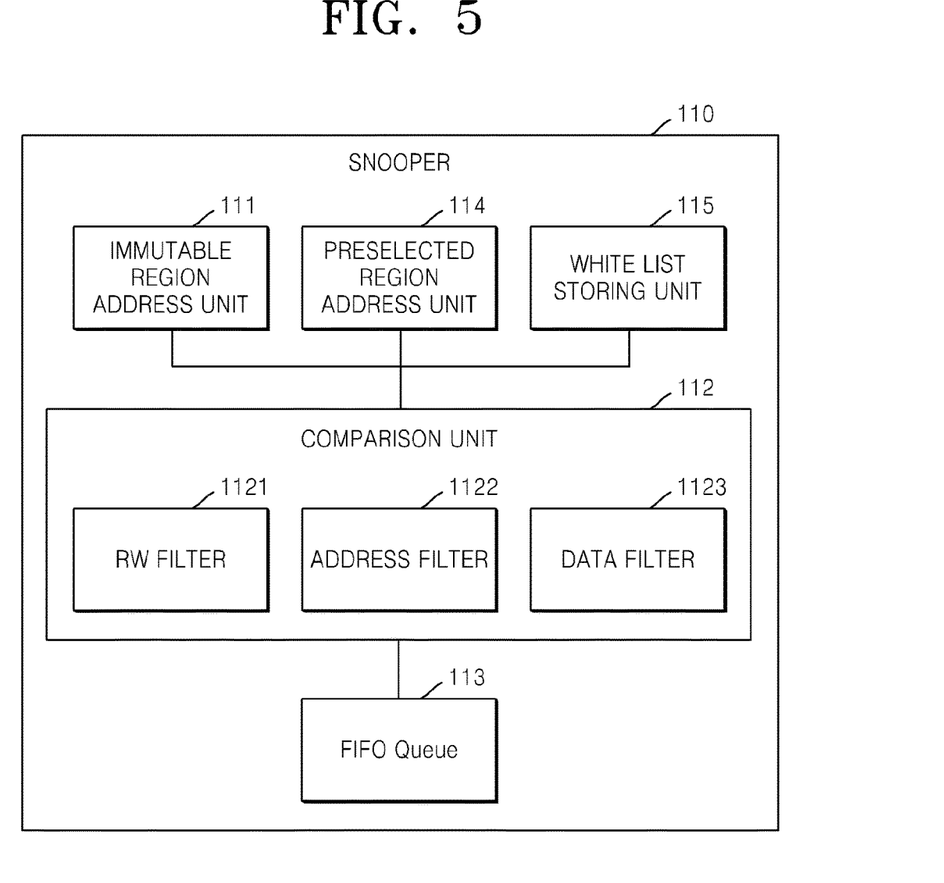
FIG. 5 is a block diagram illustrating a snooper.

FIG. 4 is a block diagram illustrating the verification unit 120, and FIG. 5 is a block diagram illustrating a snooper.

Referring to FIG. 4, the verification unit 120 includes a kernel region determination unit 121 and a snooper setting unit 122, and may further include at least one of a monitoring unit 123 and a restoration unit 124.

Referring to FIG. 5, the snooper 110 includes an immutable region address unit 111 and a comparison unit 112, and may further include at least one of a first in first out queue (FIFO Q) 113, a preselected region address unit 114 and a white list storing unit 115.

The kernel region determination unit 121 determines physical addresses of the kernel immutable region, the kernel mutable region and the preselected region, and generates a white list corresponding to the preselected region.

The kernel region determination unit 121 obtains information from the host system 10 through the bridge 160 immediately after booting of the host system 10, and determines the addresses of the kernel immutable region and the kernel mutable region.

Also, the kernel region determination unit 121 obtains information from the host system 10 through the bridge 160 while the host system 10 is executed or on demand, and determines the address of the preselected region which is an object of monitoring in the kernel mutable region. The kernel region determination unit 121 generates a white list including information on the determined address of each preselected region and information on data items allowed in each preselected region. That is, the kernel region determination unit 121 determines the address of the preselected region periodically or according to the result of the monitoring by the snooper 110, and generates a white list.

The snooper setting unit 122 is an element performing a role of setting the snooper 110. The snooper setting unit 122 records the address of the kernel immutable region in an immutable region address unit 111 of the snooper 110, records the address of the preselected region in a preselected region address unit 114, and records white lists generated corresponding to preselected regions respectively, in a white list storing unit 115.

The preselected region and the white list will now be explained briefly.

The preselected region is a set of addresses to which white listing is to be applied in the kernel mutable region. The white list means values that a memory location indicated by each preselected region is allowed to have.

For example, when addresses 0x10, 0x20, and 0x30 are a preselected region, and addresses 0x10 and 0x20 can have values of 1, 2, 3, 4 and 5, and address 0x30 can have values of 7 and 8, the preselected region address unit 114 has address values of 0x10, 0x20 and 0x30. By using this, an address filter 1122 detects an access attempt to the preselected region and delivers the attempt to a data filter 1123.

Meanwhile, the white list storing unit 115 stores the following information.

A white list corresponding to the address of a preselected region 1: {0x10, 0x20}-{1, 2, 3, 4, 5}

A white list corresponding to the address of a preselected region 2: {0x30}-{7, 8}.

The data filter 1123 fetches a corresponding white list from the white list storing unit 115 by referring to the address field 22 of the snooped traffic. For example, if the value of the address field is 0x20, the data filter 1123 fetches {1, 2, 3, 4, 5}. Then, the data filter 1123 determines whether or not the value of the data field 23 of the snooped traffic is included in the fetched white list, and if the value is not included, the data field 1123 diagnoses an abnormal situation and delivers the snooped traffic to the verification unit 120.

The monitoring unit 123 includes a logging unit 1231 and a reporting unit 1232, and may further include an analysis unit 1233.

The logging unit 1231 is an element performing a role of recording various logs, and if a write attempt in the kernel immutable region or the preselected region is detected, records a log of information on the detected write attempt and the history.

The reporting unit 1232, if a write attempt in the kernel immutable region and/or the preselected region is detected, generates a warning message including information on the detected write attempt and transmits the generated warning message to a network device or a display connected to the kernel integrity monitoring apparatus 100 or to the host system 10. Meanwhile, the reporting unit 1232 may also be set to report a warning message, including information on a write attempt which is determined to be malicious traffic, to a network device or display connected to the kernel integrity monitoring apparatus 100 or the host system 10, only when among write attempts in the preselected region there is a write attempt which is determined as malicious traffic by the snooper 110 through a comparison with a white list.

By outputting the warning message through the network device or display connected to the kernel integrity monitoring apparatus 100 or the display connected to the host system 10, the user can easily find an occurrence of malicious traffic.

The analysis unit 1233 analyzes a write attempt in the kernel immutable region or a write attempt in the preselected region and may determine whether or not to permit to write.

In the embodiment shown in FIG. 3, the snooper 110 snoops traffic occurring in the system bus 30 of the host system 10.

If the snooper 110 detects a write attempt in the kernel immutable region or the preselected region, the write attempt must have already finished performing a writing job in the memory region of the host system 10.

Accordingly, if a write attempt in the kernel immutable region or the preselected region is detected, the restoration unit 124 delivers a restoration command to cancel the job performed by the detected write attempt, to the host system 10. By referring to the record in the logging unit 1231, the restoration unit 124 delivers information related to the detected write attempt in the kernel immutable region or the preselected region, to the host system 10.

The immutable region address unit 111 is a kind of register, and stores the address of the kernel immutable region. The immutable region address unit 111 stores the address of the kernel immutable region which is transmitted by the snooper setting unit 122 of the verification unit 120 immediately after the booting of the host system 10.

The preselected region address unit 114 and the white list storing unit 115 are also kinds of registers, and store the address of the preselected region and the white list, respectively. The preselected address unit 114 and the white list storing unit 115 store the address of the preselected region and the white list, respectively, which are transmitted by the snooper setting unit 122 of the verification unit 120 immediately after the booting of the host system 10.

The comparison unit 112 detects a write attempt in the kernel immutable region and a write attempt in the preselected region among the traffic snooped by the snooper 110.

For this, the comparison unit 112 includes a RW filter 1121 and an address filter 1122, and may further include a data filter 1123.

The RW filter 1121, first, determines whether or not the snooped traffic is a read attempt or a write attempt, and filters traffic corresponding to only a write attempt. If traffic is a read attempt, the comparison unit 112 does not perform a comparison procedure for the address or data.

If traffic is a write attempt, the address filter 1122 refers to the immutable region address unit 111 and the preselected region address unit 114, and determines whether the write attempt is a write attempt in the kernel immutable region or a write attempt in the preselected region.

If it is a write attempt in the kernel immutable region, the comparison unit 112 provides contents including the RW field and the address field in the snooped traffic, to the verification unit 120.

If it is a write attempt in the preselected region, the comparison unit 112 provides contents including the RW field, the address field, and the data field, to the verification unit 120.

Meanwhile, if a write attempt in the preselected region is detected, the data filter 1123 of the comparison unit 112 compare a white list corresponding to the preselected region with the data field of the snooped traffic, and determines whether or not the snooped traffic is malicious traffic for the preselected region.

The comparison unit 112 may be set to extract only malicious traffic among write attempts in the preselected region, and then, provide contents including the RW field, the address field, and the data field of the extracted malicious traffic, to the verification unit 120.

Meanwhile, the comparison unit 112 may also detect a write attempt in the kernel immutable region or the preselected region, by determining whether snooped traffic is a write attempt or a read attempt, after first determining the snooped traffic is for which region, by performing comparison of the address field of the snooped traffic.

The comparison unit 112 should be designed to have a selective traffic collection algorithm like this. The comparison unit 112 should recognize only a write attempt in the kernel immutable region and a write attempt in the preselected region, which are meaningful information, while other unnecessary traffic is discarded.

For smooth processing of traffic in the system bus 30 during a traffic congestion, the FIFO Q 113 provides snooped traffic sequentially to the comparison unit 112.

Figure 6:
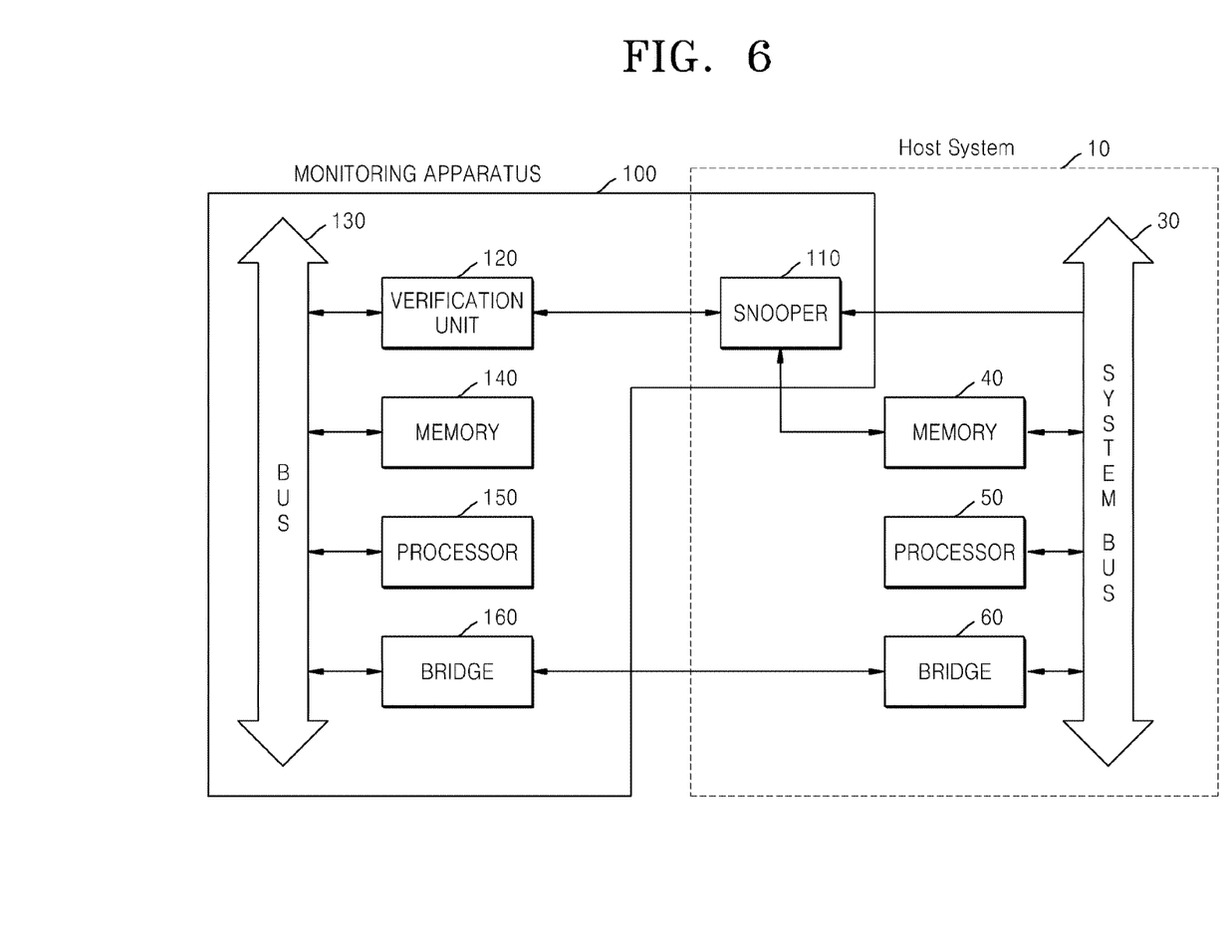
FIG. 6 is a block diagram illustrating a snoop-based kernel integrity monitoring apparatus according to a second exemplary embodiment of the present invention.

FIG. 6 is a block diagram illustrating a snoop-based kernel integrity monitoring apparatus according to a second exemplary embodiment of the present invention.

Referring to FIG. 6, the kernel integrity monitoring apparatus 100 according to the second exemplary embodiment includes a snooper 110 and a verification unit 120 as in the embodiment shown in FIG. 3.

The embodiment shown in FIG. 6 is the same as the embodiment shown in FIG. 3 except the connection between the snooper 110 and the memory 40 of the host system 10, and each component shown in FIG. 6 performs the same function as the corresponding component shown in FIG. 3. Accordingly, detailed and overlapping explanations will be omitted.

In the embodiment shown in FIG. 6, the snooper 110 is provided between the system bus 10 and the memory 40 of the host system 10.

If snooped traffic is not a write attempt in the kernel immutable region or the preselected region, the snooper 110 of FIG. 6 directly delivers the snooped traffic to the memory 40, but if the snooped traffic is a write attempt in the kernel immutable region or the preselected region, the snooper 110 stops the write attempt in the kernel immutable region or the preselected region, and does not deliver the write attempt to the memory 40.

In this embodiment, a write attempt in the kernel immutable region or the preselected region is blocked from the source, and the verification unit 120 does not need such an element as the restoration unit 124 shown in FIG. 4.

The snoop-based kernel integrity monitoring apparatus 100 according to the present invention can be applied to a variety of platforms such as application processors for a desktop computer, a server, and mobile devices as well as small-sized embedded systems A snoop-based kernel integrity monitoring method according to an exemplary embodiment of the present invention will now be explained.

As the snoop-based kernel integrity monitoring method according to the exemplary embodiment of the present invention is essentially the same as the snoop-based kernel integrity monitoring apparatus according to the present invention, detailed and overlapping explanations will be omitted.

Figure 7:
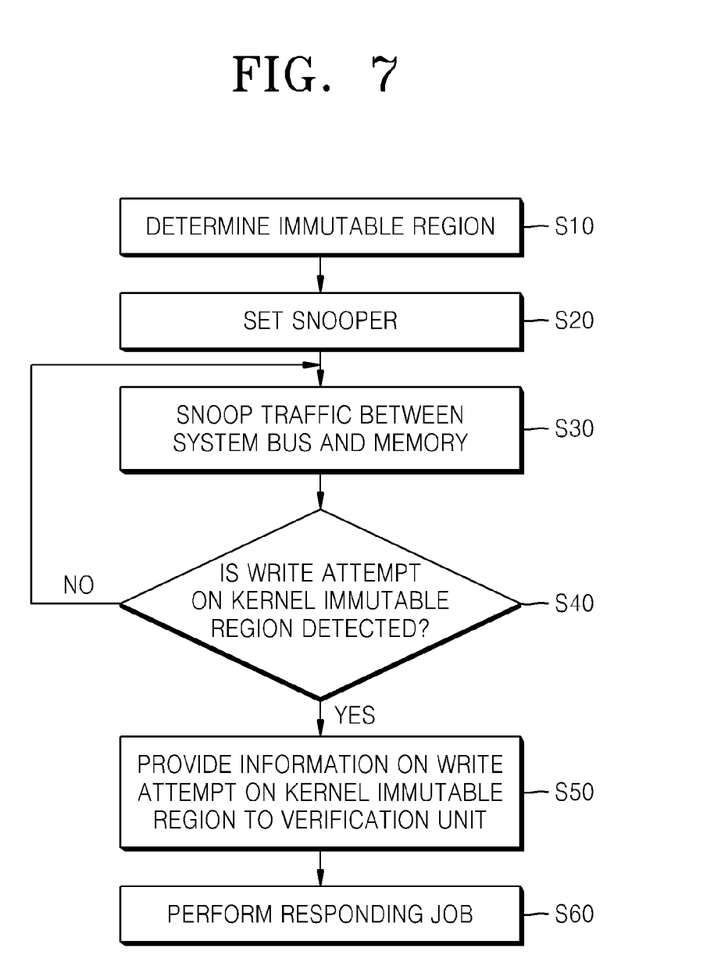
FIG. 7 is a flowchart illustrating a kernel integrity monitoring method according to an exemplary embodiment of the present invention.

First, the verification unit 120 of the kernel integrity monitoring apparatus 100 determines the address of the kernel immutable region in operation S10 by obtaining information from the host system 10 through the bridge immediately after booting. At the same time, the kernel integrity monitoring apparatus 100 may determine the address of the preselected region and generate a white list corresponding to each preselected region.

Then, the verification unit 120 of the kernel integrity monitoring apparatus 100 records the determined address of the kernel immutable region in the immutable region address unit 111 of the snooper 110, and thus sets the snooper in operation S20. At the same time, the verification unit 120 may set the snooper by recording the address of the preselected region in the preselected region address unit 114 of the snooper 110 and the generated white list in the white list storing unit 115 of the snooper 110.

The snooper 110 is connected to the system bus 30 of the host system 10 and snoops traffic occurring in the system bus 30 of the host system 10 in operation S30.

The snooper 110 analyzes snooped traffic and determines whether or not there is a write attempt in the kernel immutable region and/or the preselected region among the snooped traffic in operation S40.

If a write attempt in the kernel immutable region and/or the preselected region is detected, the snooper 110 provides information on the write attempt in the kernel immutable region and/or the preselected region to the verification unit 120 of the kernel integrity monitoring apparatus 100 in operation S50. If a write attempt in the kernel immutable region and/or the preselected region is not detected, the snooper 110 repeats operations S30 and S40.

As described above, if there is a write attempt in the kernel immutable region, the comparison unit 112 provides contents including the RW field and the address field in the snooped traffic, to the verification unit 120. If there is a write attempt in the preselected region, the comparison unit 112 provides the RW field, the address field and the data field to the verification unit 120. Meanwhile, if a write attempt in the preselected region is detected, the comparison unit 112 may be set to extract only malicious traffic among write attempts in the preselected region, and provide the contents including the RW field, the address field and the data field of the extracted malicious traffic, to the verification unit 120.

If a write attempt in the kernel immutable region and/or the preselected region is detected, the verification unit 120 of the kernel integrity monitoring apparatus 100 performs a responding job in operation S60.

Though not shown in FIG. 7, the verification unit 120 of the kernel integrity monitoring apparatus 100 performs the following responding job when a write attempt in the kernel immutable region and/or the preselected region is detected.

First, the verification unit 120 of the kernel integrity monitoring apparatus 100 generates a warning message including information on the write attempt in the kernel immutable region and/or the preselected region received from the snooper 110, and transmits the generated warning message to the network device or display connected to the kernel integrity monitoring apparatus 100 or the host system 10.

By outputting the warning message through the network device or display connected to the kernel integrity monitoring apparatus 100 or the display of the host system 10, the user can easily find whether or not malicious traffic occurs.

Meanwhile, when the snooper 10 snoops traffic occurring in the system 30 as the embodiment shown in FIG. 3, the verification unit 120 of the kernel integrity monitoring apparatus 100 additionally performs a job delivering to the host system 10 a restoration command to cancel the job performed by the detected write attempt in the kernel immutable region and/or the preselected region.

Meanwhile, referring to the embodiment shown in FIG. 6, the snooper 110 of FIG. 6 is provided between the system bus 30 and the memory 40. If the snooped traffic is not a write attempt in the kernel immutable region or the preselected region, the snooper 110 according to the embodiment shown in FIG. 6 directly delivers the snooped traffic to the memory 40, but if the snooped traffic is a write attempt in the kernel immutable region or the preselected region, the snooper 110 stops the write attempt and does not deliver the write attempt in the kernel immutable region or the preselected region, to the memory 40. Since a write attempt in the kernel immutable region or the preselected region is blocked from the source in the embodiment of FIG. 6, the verification unit 120 of the kernel integrity monitoring apparatus 100 does not perform a job to deliver a restoration command to the host system 10.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A snoop-based kernel integrity monitoring apparatus comprising:
   a snooper which stores an address of a kernel immutable region, and snoops traffic occurring in a system bus of a host system, and detects a write attempt in the kernel immutable region; and
   a verification unit which if the write attempt in the kernel immutable region is detected, generates a warning message including information on the detected write attempt in the kernel immutable region,
   wherein the kernel immutable region comprises at least one of a kernel code region, a system call table, and an interrupt descriptor table.

2. The apparatus of claim 1, which operates independently of the host system.

3. The apparatus of claim 1, wherein the snooper comprises:
   an immutable region address unit which stores the address of the kernel immutable region; and
   a comparison unit which compares the snooped traffic with the address of the kernel immutable region and thus detects the write attempt in the kernel immutable region.

4. The apparatus of claim 1, wherein the verification unit comprises:
   an immutable region determination unit which determines the address of the kernel immutable region by obtaining information from the host system through a bridge after the host system is booted; and
   a snooper setting unit which records the determined address of the kernel immutable region in the immutable region address unit.

5. The apparatus of claim 1, wherein the verification unit further comprises a logging unit which records a history of write attempts in the kernel immutable region.

6. The apparatus of claim 1, wherein the snooper further comprises a first in first out (FIFO) queue which provides the snooped traffic sequentially to the comparison unit.

7. The apparatus of claim 1, wherein the verification unit further comprises a restoration unit which if a write attempt in the kernel immutable region is detected, delivers to the host system a restoration command to cancel jobs performed by the detected write attempt in the kernel immutable region.

8. The apparatus of claim 1, wherein the snooper is provided between a system bus of the host system and a memory, and if the snooped traffic is not a write attempt in the kernel immutable region, delivers the snooped traffic to the memory, and if the snooped traffic is a write attempt in the kernel immutable region, does not deliver the snooped traffic to the memory.

9. A snoop-based kernel integrity monitoring method comprising:
   determining an address of a kernel immutable region by obtaining information from a host system through a bridge after the host system is booted;
   recording the determined address of the kernel immutable region in a snooper which is connected to a system bus of the host system;
   snooping traffic occurring in the system bus of the host system through the snooper;
   detecting a write attempt in the kernel immutable region in the snooped traffic; and
   if a write attempt in the kernel immutable region is detected, generating a warning message including information on the detected write attempt in the kernel immutable region.

10. The method of claim 9, further comprising recording a history of write attempts in the kernel immutable region.

11. The method of claim 9, further comprising, if a write attempt in the kernel immutable region is detected, delivering to the host system a restoration command to cancel jobs performed by the detected write attempt in the kernel immutable region.

12. The method of claim 9, further comprising, if the snooped traffic is not a write attempt in the kernel immutable region, delivering the snooped traffic to a memory, and if the snooped traffic is a write attempt in the kernel immutable region, stopping the write attempt in the kernel immutable region,
   wherein the snooper is provided between the system bus of the host system and the memory.

13. A snoop-based kernel integrity monitoring apparatus comprising:

a snooper which stores an address of a monitoring region in which any modification is capable of violating integrity of an operating system, snoops traffic occurring in a system bus of a host system, and detects a write attempt in the monitoring region among the snooped traffic; and a verification unit which if a write attempt in the monitoring region is detected, generates a warning message including information on the detected write attempt in the monitoring region, wherein the monitoring region comprises:

a preselected region which is preselected in a kernel mutable region; and a kernel immutable region.

14. The apparatus of claim 13, wherein the kernel immutable region comprises at least one of a kernel code region, a system call table, and an interrupt descriptor table, and the preselected region comprises at least one of a dispatch table and a data structure.

15. The apparatus of claim 13, which operates independently of the host system.

16. The apparatus of claim 13, wherein the snooper comprises:

an immutable region address unit which stores an address of the kernel immutable region;

a preselected region address unit which stores an address of the preselected region; and a comparison unit which compares the snooped traffic with the addresses of the kernel immutable region and the preselected region, and thus detects a write attempt in the monitoring region.

17. The apparatus of claim 16, wherein the snooper further comprises a white list storing unit which stores a white list including information on data items which are allowed in the address of each preselected region, and the comparison unit compares a data field of the snooped traffic with the white list, and determines whether or not the snooped traffic is malicious traffic in relation to the preselected region.

18. The apparatus of claim 17, wherein the verification unit comprises:

a kernel region determination unit which obtains information through a bridge from the host system, determines the addresses of the kernel immutable region, the kernel mutable region and the preselected region, and generates the white list; and a snooper setting unit which records the determined address of the kernel immutable region in the immutable region address unit, records the determined address of the preselected region in the preselected region address unit, and records the generated white list in the white list storing unit.

19. The apparatus of claim 16, wherein if a write traffic in the kernel immutable region is detected, the comparison unit provides contents of a read/write field and an address field in the detected write traffic, to the verification unit, and if a write traffic in the preselected region is detected, the comparison unit provides the contents of a read/write field, an address field, and a data field in the detected write traffic, to the verification unit.

20. A snoop-based kernel integrity monitoring method comprising:

determining an address of a monitoring region which is capable of violating integrity of an operating system, by obtaining information through a bridge from a host system;

recording the address of the monitoring region in a snooper connected to a system bus of the host system;

snooping traffic occurring in the system bus of the host system through the snooper;

detecting a write attempt in the monitoring region in the snooped traffic; and if a write attempt in the monitoring region is detected, generating a warning message including information on the detected write attempt in the monitoring region, wherein the monitoring region comprises:

a preselected region which is preselected in a kernel mutable region; and a kernel immutable region.

21. The method of claim 20, wherein the kernel immutable region comprises at least one of a kernel code region, a system call table, and an interrupt descriptor table, and the preselected region comprises at least one of a dispatch table and a data structure.

22. The method of claim 20, further comprising:

generating a white list including information on data items which are allowed in an address of each preselected region; and comparing a data field of the snooped traffic with the white list, and determining whether or not the snooped traffic is malicious traffic in relation to the preselected region.

* * * * *